United States Patent
Xiong et al.

(10) Patent No.: US 10,682,772 B2
(45) Date of Patent: Jun. 16, 2020

(54) REVERSIBLE MECHANICAL ARM GRAVITATIONAL TORQUE BALANCING DEVICE

(71) Applicant: Huazhong University of Science and Technology, Wuhan, Hubei (CN)

(72) Inventors: Caihua Xiong, Hubei (CN); Chenbo Wang, Hubei (CN); Xuan Wu, Hubei (CN); Jianbo Tao, Hubei (CN); Chang He, Hubei (CN); Wei Mao, Hubei (CN)

(73) Assignee: HUAZHONG UNIVERSITY OF SCIENCE AND TECHNOLOGY, Wuhan, Hubei (CN)

( * ) Notice: Subject to any disclaimer, the term of this patent is extended or adjusted under 35 U.S.C. 154(b) by 198 days.

(21) Appl. No.: 16/011,314

(22) Filed: Jun. 18, 2018

(65) Prior Publication Data

US 2019/0321986 A1 Oct. 24, 2019

(30) Foreign Application Priority Data

Apr. 20, 2018 (CN) .......................... 2018 1 0357674

(51) Int. Cl.
*B25J 19/00* (2006.01)
*A61H 1/02* (2006.01)
*B25J 18/04* (2006.01)

(52) U.S. Cl.
CPC .............. *B25J 19/002* (2013.01); *A61H 1/02* (2013.01); *B25J 19/0016* (2013.01); *B25J 18/04* (2013.01)

(58) Field of Classification Search
CPC ...... B25J 18/04; B25J 19/002; B25J 19/0016; B25J 19/0008; A61H 1/00; A61H 1/02; A61H 2201/12
See application file for complete search history.

(56) References Cited

U.S. PATENT DOCUMENTS

| 2,058,280 A * | 10/1936 | Wells ....................... G06G 1/00 |
| | | 235/61 G |
| 2004/0250644 A1* | 12/2004 | Gosselin .................... B25J 9/04 |
| | | 74/490.04 |

(Continued)

FOREIGN PATENT DOCUMENTS

WO WO-2018014558 A1 * 1/2018 ............. A63B 22/02

OTHER PUBLICATIONS

Machine Translation of WO 2018/014558, obtained Feb. 13, 2020.*

*Primary Examiner* — Richard W Ridley
*Assistant Examiner* — Brian J McGovern
(74) *Attorney, Agent, or Firm* — Hamre, Schumann, Mueller & Larson, P.C.

(57) ABSTRACT

The present invention belongs to the field of medical rehabilitation training equipment, and particularly discloses a reversible mechanical arm gravitational torque balancing device, comprising a counterweight guide groove module, a counterweight, a mechanical arm joint, a rope, a guide pulley block, a counterweight disc, a mechanical arm joint link and a rack. The counterweight guide groove module is mounted on the rack; the counterweight has a lower end mounted on the counterweight guide groove module and an upper end connected to the rope, and the rope is wound on the counterweight disc after passing through the guide pulley block mounted on the rack; the mechanical arm joint is mounted on the rack and internally provided with a motor; the counterweight disc is mounted on an output shaft of the motor of the mechanical arm joint; and the mechanical arm joint link is also mounted on the output shaft of the motor of the mechanical arm joint and the gravity of the mechanical arm joint link produces a gravitational torque on the mechanical arm joint. The present invention can change the direction of the provided balance torque when the mechani- (Continued)

cal arm performs the morphological transformation, and features simple, rapid and labor-saving operation as well as reliable structure.

6 Claims, 2 Drawing Sheets

(56) References Cited

U.S. PATENT DOCUMENTS

| | | | |
|---|---|---|---|
| 2019/0360452 A1* | 11/2019 | Qu | F03B 13/1875 |
| 2020/0000670 A1* | 1/2020 | Xiong | B25J 11/008 |
| 2020/0000671 A1* | 1/2020 | Xiong | A63B 21/00181 |

* cited by examiner

REVERSIBLE MECHANICAL ARM GRAVITATIONAL TORQUE BALANCING DEVICE

BACKGROUND OF THE PRESENT INVENTION

Field of the Present Invention

The present invention belongs to the field of medical rehabilitation training equipment, and particularly relates to a reversible mechanical arm gravitational torque balancing device.

Description of the Related Art

The series-connection mechanical arm inevitably generates, due to its own structural characteristics, a gravitational torque caused by its own weight at the joints. When the mechanical arm is working, the superposition of the gravitational torque and loads can easily lead to motor overload at the joints. The mechanical arm gravitational torque balancing device can effectively reduce the influence of the gravitational torque caused by its own weight on the joint load, thereby greatly reducing the burden on the motor and speed reducer.

Medical rehabilitation training equipment, especially in a form of a robotic with four limbs, mostly needs to have a certain deformation capacity so as to meet different requirements of the left limb and the right limb. Since the left limb and the right limb can be regarded to approximately have a mirror-image relationship, the balance torque required to balance the gravitational torque of the limbs is opposite in direction and equal in size to the gravitational torque. However, most of the traditional gravitational torque balancing devices can only produce a balance torque in a single direction, and thus it is difficult to meet the requirements.

SUMMARY OF THE PRESENT INVENTION

In view of the above-described problems, the present invention aims to provide a reversible mechanical arm gravitational torque balancing device which can change the direction of the provided balance torque when the mechanical arm performs the morphological transformation. This device features simple, rapid and labor-saving operation as well as a reliable structure.

In order to achieve the above objective, the present invention provides a reversible mechanical arm gravitational torque balancing device, comprising: a counterweight guide groove module, a counterweight, a mechanical arm joint, a rope, a guide pulley block, a counterweight disc, a mechanical arm joint link and a rack, wherein the counterweight guide groove module is mounted on the rack to limit the movement of the counterweight, thereby achieving the clamping function; the counterweight has a lower end mounted on the counterweight guide groove module and an upper end connected to the rope, and the rope is wound on the counterweight disc after passing through the guide pulley block mounted on the rack; the mechanical arm joint is mounted on the rack and internally provided with a motor; the counterweight disc is mounted on an output shaft of the motor of the mechanical arm joint and the mechanical arm joint limits the rotational degree of freedom of the counterweight disc around the output shaft of the motor; and the mechanical arm joint link is also mounted on the output shaft of the motor of the mechanical arm joint and the gravity of the mechanical arm joint link produces a gravitational torque on the mechanical arm joint.

Preferably, the counterweight guide groove module includes a counterweight mounting block, a reversing guide groove portion, a clamping device, a guide shaft and a module base plate, in which the counterweight is mounted on an upper end of the counterweight mounting block; an upper end of the reversing guide groove portion is mounted on the lower end of the counterweight mounting block, a guide hole matched with the guide shaft is formed in the middle part of the reversing guide groove portion, and a guide groove having a preset shape is formed on the side of the reversing guide groove portion; the clamping device is mounted on the module base plate; a lower end of the guide shaft is mounted on the module base plate; and the reversing guide groove portion is movable up and down along the guide shaft and during the up-and-down movement of the reversing guide groove portion, the guide groove having a preset shape on the side of the reversing guide groove portion cooperates with the clamping device to limit the movement of the reversing guide groove portion in a predetermined position, thereby achieving the clamping function.

Preferably, the clamping device includes a clamping pin, a clamping pin mounting bracket, a linear guide, a spring and a spring mounting bracket, in which the clamping pin is mounted on an upper end of the clamping pin mounting bracket; a lower end of the clamping pin mounting bracket is mounted on the upper end of the linear guide; the lower end of the linear guide is mounted on the module base plate; the spring has one end connected to the clamping pin mounting bracket and the other end connected to the spring mounting bracket; and the spring mounting bracket is mounted on the module base plate.

Preferably, the clamping pin and the clamping pin mounting bracket as a whole are mounted on the linear guide and movable along the linear guide; and the spring exerts a pulling force on the clamping pin mounting bracket so that the clamping pin and the clamping pin mounting bracket as a whole have a tendency to move toward the spring.

Preferably, the gravity of the counterweight and the counterweight mounting block and the reversing guide groove portion of the counterweight guide groove module is converted into a pulling force on the rope, and the pulling force is converted into, on the counterweight disc, a balance torque which is opposite in direction to the gravitational torque and plays a role in balancing the gravitational torque.

Preferably, when the direction of the balance torque needs to be changed, the counterweight disk is driven by the motor of the mechanical arm joint to rotate in the opposite direction of the initial balance torque, so that the counterweight ascends and then stops ascending under the limitation of the guide groove having a preset shape on the side of the reversing guide groove portion; the motor of the mechanical arm joint is stopped, so that the counterweight descends under the action of gravity and then stops descending under the limitation of the guide groove during the descending process; the limitation of the counterweight disc by the mechanical arm joint is released; the counterweight disc is rotated in the direction of the initial balance torque to allow the rope to be reversely wound on the counterweight disc, and then the limitation of the counterweight disc by the mechanical arm joint is restored; the counterweight disk is driven by the motor of the mechanical arm joint to rotate in the direction of the initial balance torque, so that the counterweight ascends and then stops ascending under the limitation of the guide groove; and the motor of the mechanical arm joint is stopped, so that at this time, a balance torque, which is converted from the pulling force on the rope, on the counterweight disk is opposite in direction and equal in size to the initial balance torque, thereby achieve the reversing of the balance torque In general, compared with the prior art, the present invention has the following beneficial effects:

1. the invention can achieve the change of the direction of the balance torque of the gravitational torque while providing the balance torque of the gravitational torque, which can meet the need of balance torques in different directions to cancel out the gravitational torque after the medical rehabilitation training equipment performs the morphological transformation;

2. the invention has simple control, and the change of the direction of the balance torque of the gravitational torque can be achieved only by control the positive and reverse rotations of the mechanical arm joint and the relative movement relationship between the counterweight disc and the mechanical arm joint; and 3. in the present invention, the force resulting in the balance torque of the gravitational torque is generated by the guide pulley block and the counterweight, and the guide pulley block and the counterweight features convenient and flexible arrangement, which can greatly improve the design flexibility.

DETAILED DESCRIPTION OF THE EMBODIMENTS

For clear understanding of the objectives, features and advantages of the present invention, detailed description of the present invention will be given below in conjunction with accompanying drawings and specific embodiments. It should be noted that the embodiments described herein are only meant to explain the present invention, and not to limit the scope of the present invention.

Figure 1:
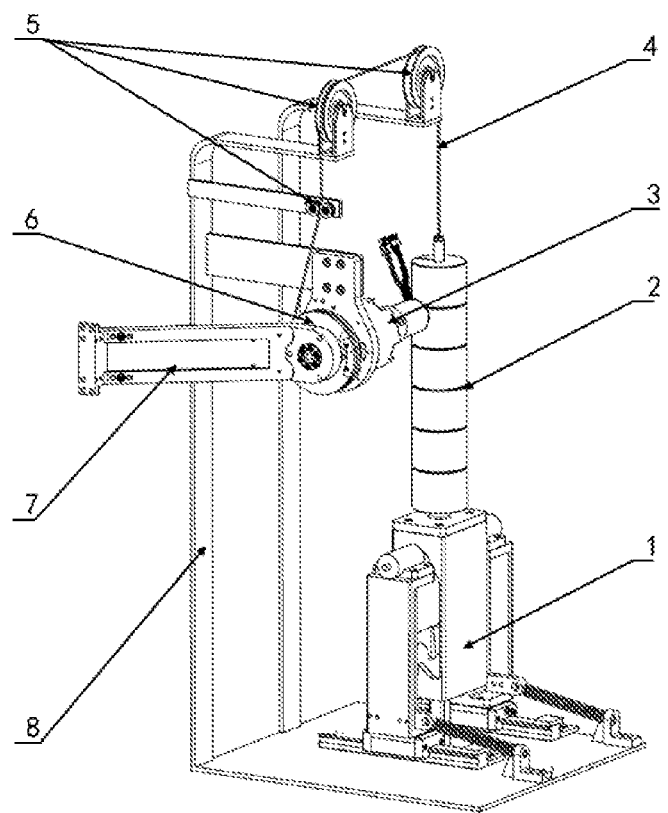
FIG. 1 is a schematic structural diagram of a reversible mechanical arm gravitational torque balancing device according to the present invention.

FIG. 1 is a schematic structural diagram of a reversible mechanical arm gravitational torque balancing device according to the present invention. As shown in FIG. 1, the device includes a counterweight guide groove module 1, a counterweight 2, a mechanical arm joint 3, a rope 4, a guide pulley block 5, a counterweight disc 6, a mechanical arm joint link 7 and a rack 8, in which the counterweight guide groove module 1 is mounted on the rack 8 by screws, for example, and has a function of limiting movement of the counterweight 2 in a predetermined position, thereby achieving the clamping function; the counterweight 2 has a lower end mounted on the counterweight guide groove module 1 and an upper end connected to the rope 4, and the rope 4 has one end connected to the upper end of the counterweight 2 and the other end wound on the counterweight disc 6 after passing through the guide pulley block 5, so that the pulling force on the rope 4 is converted into, on the counterweight disc 6, a torque which is opposite in direction to the gravitational torque and plays a role in balancing the gravitational torque; the guide pulley block 5 is mounted on the rack 8 by screws, for example; the mechanical arm joint 3 is mounted on the rack 8 by screws, for example, and is internally provided with a motor to generate a rotational motion; the mechanical arm joint 3 can limit the rotational degree of freedom of the counterweight disc 6 around the output shaft of the motor (i.e., limiting the rotational movement of the counterweight disc 6), for example, by using pins, bolts and the like (the limitation can also be released); the counterweight disc 6 is mounted on the output shaft of the motor of the mechanical arm joint 3 via a bearing, for example; and the mechanical arm joint link 7 is also mounted on the output shaft of the motor of the mechanical arm joint 3, and the gravity of the mechanical arm joint link 7 produces a corresponding gravitational torque on the mechanical arm joint 3, in which the mechanical arm joint link 7 can be replaced by or expanded into a mechanical arm with different functions according to design requirements.

Figure 2:
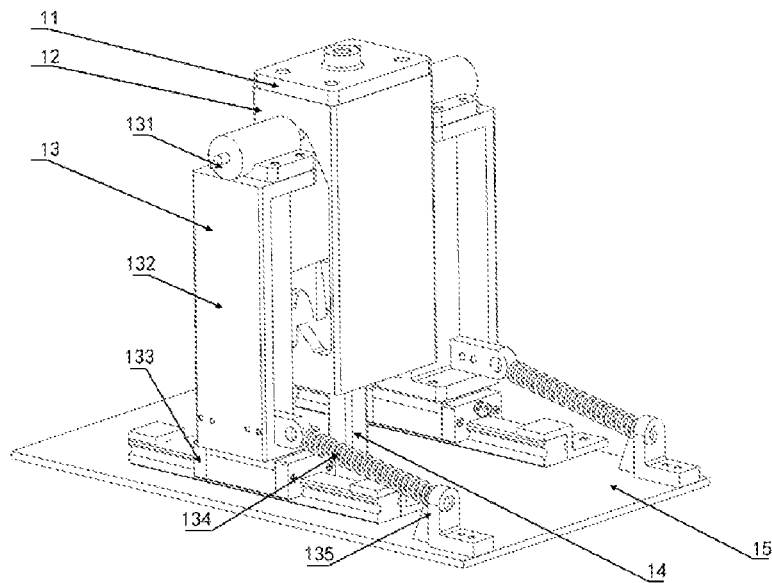
FIG. 2 is a schematic structural diagram of a counterweight guide groove module according to the present invention.

FIG. 2 is a schematic structural diagram of the counterweight guide groove module according to the present invention. As shown in FIG. 2, the counterweight guide groove module 1 includes a counterweight mounting block 11, a reversing guide groove portion 12, a clamping device 13, a guide shaft 14 and a module base plate 15, in which the counterweight 2 is mounted on the upper end of the counterweight mounting block 11; the upper end of the reversing guide groove portion 12 is mounted on the lower end of the counterweight mounting block 11 by bolts, for example, a guide hole matched with the guide shaft 14 is formed in the middle part of the reversing guide groove portion 12 to allow up-and-down movement along the guide shaft, and a guide groove having a preset shape is formed on the side of the reversing guide groove portion 12 (the preset shape can be designed or defined according to actual requirements); the clamping device 13 is mounted on the module base plate 15 by screws, for example, and cooperates with the guide groove on the side of the reversing guide groove portion 12; the lower end of the guide shaft 14 is mounted on the module base plate 15 by screws, for example; and the reversing guide groove portion 12 can move up and down along the guide shaft 14, and during the up-and-down movement of the reversing guide groove portion 12, the guide groove having a preset shape on the side of the reversing guide groove portion 12 cooperates with the clamping device 13 to limit the movement of the reversing guide groove portion 12 in a predetermined position, thereby achieving the clamping function.

The predetermined position can be defined according to actual requirements. For example, to limit the upward movement of the reversing guide groove portion 12 with a movement distance of, for example, 50 mm, the reversing guide groove portion is clamped by the clamping device 13 after it moves upwards by 50 mm, so that the reversing guide groove portion 12 cannot continue upward movement, that is, limitation of the upward movement of the reversing guide groove portion at the predetermined position is achieved. The same applies to the downward movement and the description is not repeated.

Specifically, the counterweight 2 is formed by a set of copper blocks strung into a whole by a shaft, and one end of the shaft can be threaded into the counterweight mounting block 11 of the counterweight guide groove module 1. In addition, one end of the mechanical arm joint link 7 is installed on the motor shaft of the mechanical arm joint 3 through a key axle bush, and the other end of the mechanical arm joint link 7 can be installed with other mechanical arm assemblies according to actual design requirements.

Further, a pin convenient for plugging and pulling can be provided on the counterweight disc 6 to match with a pin hole on the mechanical arm joint 3, so that the relative rotation of the counterweight disc 6 around the motor shaft of the mechanical arm joint 3 can be limited, and a balance torque generated on the counterweight disc 6 can be transmitted to the motor shaft of the mechanical arm joint 3 so as to balance the gravitational torque.

More specifically, the rope 4 is a steel wire rope, one end of which is connected to the upper end of the counterweight 2 by a wire rope aluminum collet, and the other of which is fixed on the counterweight disc 6 by a wire rope aluminum collet after it passes through the guide pulley block 5 and is wound by a half circle in the wheel groove of the counterweight disk 6.

As shown in FIG. 2, the clamping device 13 includes a clamping pin 131, a clamping pin mounting bracket 132, a linear guide 133, a spring 134 and a spring mounting bracket 135, in which the clamping pin 131 is mounted on the upper end of the clamping pin mounting bracket 132 by screws, for example, and cooperates with the guide groove having a preset shape on the side of the reversing guide groove portion 12; the lower end of the clamping pin mounting bracket 132 is mounted on the upper end of the linear guide 133; the lower end of the linear guide 133 is mounted on the module base plate 15 by screws, for example; one end of the spring 134 is connected to the clamping pin mounting bracket 132 and the other end of the spring 134 is connected to the spring mounting bracket 135; and the spring mounting bracket 135 is mounted on the module base plate 15 by screws, for example. After the installation is completed, the clamping pin 131 and the clamping pin mounting bracket 132 can be regarded as a whole and be, as a whole, mounted on the linear guide 133 to move along the linear guide. The mounted spring 134 can exert a pulling force on the clamping pin mounting bracket 132 so that the clamping pin 131 and the clamping pin mounting bracket 132 as a whole have a tendency to move toward the spring. Since the spring 134 continuously provides a lateral pulling force for the clamping device 13, the clamping device 13 always has a tendency to move in the force direction, and thus, the clamping device 13 can always be abutted against the edge of the guide groove of the reversing guide groove portion 12 during the movement.

After the installation of the device is completed, the gravity of the counterweight 2 and the counterweight mounting block 11 and the reversing guide groove portion 12 of the counterweight guide groove module 1 is converted into a pulling force on the rope 4, and the pulling force on the rope 4 is converted into a torque after its direction is changed by the guide pulley block 5. This torque can be transmitted to the motor shaft of the mechanical arm joint 3 through the pin on the counterweight disc 6, has a direction opposite to that of the gravitational torque and plays a role in balancing the gravitational torque, and thus, this torque is referred to as a balance torque. The clamping pin mounting bracket 132 of the clamping device 13 is mounted on the linear guide 133, and thus, the clamping pin 13 has the ability to move horizontally; the reversing guide groove portion 12 moves along the guide shaft 14, and thus has the ability to move up and down. According to the principle of relative movement, it can be considered that the clamping pin 131 has the ability to move up and down with respect to the reversing guide groove portion 12, and the reversing guide groove portion 12 is stationary.

Specifically, the clamping pin 131 includes a housing, a pin and a spring, in which the pin cooperates with the guide groove on the side of the reversing guide groove portion. The pin is connected to the housing through the spring and the spring can continuously provide a force to push out the pin, so that the pin can always rest against the surface of the guide groove of the reversing guide groove portion 12.

In the actual operation process, when the direction of the balance torque needs to be changed, the counterweight disk 6 is driven by the motor of the mechanical arm joint 3 to rotate in the opposite direction of the balance torque, so that the counterweight 2 ascends and then stops ascending under the limitation of the guide groove having a preset shape on the side of the reversing guide groove portion 12; the motor of the mechanical arm joint 3 is stopped, namely, the counterweight disk 6 is not driven to rotate in the opposite direction of the balance torque, so that the counterweight 2 descends under the action of gravity and then stops descending under the limitation of the guide groove during the descending process; the limitation of the rotational degree of freedom of the counterweight disc 6 around the motor output shaft by the mechanical arm joint 3 is released, the counterweight disc 6 is rotated in the direction of the balance torque to release the rope 4 from the counterweight disc 6, the counterweight disc 6 is further rotated so that the rope 4 is reversely wound on the counterweight disc 6, and then the limitation of the rotational degree of freedom of the counterweight disc 6 around the motor output shaft by the mechanical arm joint 3 is restored; the counterweight disk 6 is driven by the motor of the mechanical arm joint 3 to rotate in the direction of the initial balance torque, so that the counterweight 2 ascends and then stops ascending under the limitation of the guide groove; and the motor of the mechanical arm joint 3 is stopped, namely, the counterweight disk 6 is not driven to rotate in the direction of the initial balance torque, so that at this time, a balance torque, which is converted from the pulling force on the rope 4, on the counterweight disk 6 is opposite in direction and equal in size to the initial balance torque, thereby achieve the reversing of the balance torque.

Figure 3:
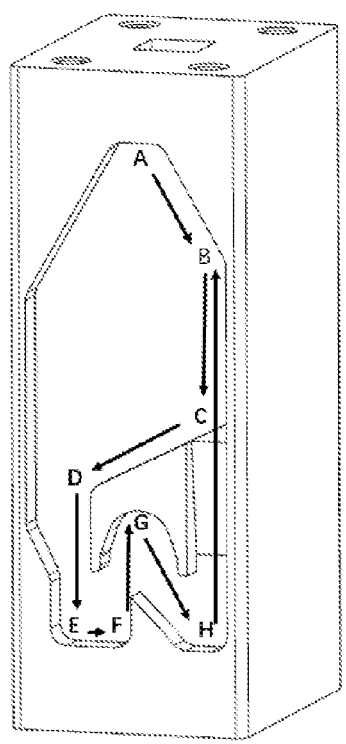
FIG. 3 is a schematic diagram showing a shape of the guide groove on the side of the reversing guide groove portion according to the present invention.

Specifically, a guide groove as shown in FIG. 3 can be designed, and how to change the direction of the balance torque will be described below. The counterweight disc 6 is driven by the motor of the mechanical arm joint 3 to positively rotate (rotate in the opposite direction of the initial balance torque) such that the counterweight and the reversing guide groove portion ascend until the reversing guide groove portion 12 is clamped, during which, the movement path of the clamping pin 131 in the guide groove of the reversing guide groove portion 12 is as shown in FIG. 3: A→B→C→D→E→F (due to the pulling force of the spring 134, the clamping pin 131 can be moved from E to F, and a step is designed at the point C such that the clamping pin 131 can only move from bottom to top, but cannot move from top to bottom) and due to the shape limitation of the guide groove at the point F, the reversing guide groove portion 12 cannot continue to ascend, thereby achieving the clamping effect; the motor of the mechanical arm joint 3 is stopped, namely, the counterweight disk 6 is not driven to positively rotate, so that under the gravity action of the counterweight 2 and the reversing guide groove portion 12, the counterweight disc 6 is reversely rotated (rotated in the direction of the initial balance torque) by a certain angle and then the reversing guide groove portion 12 is clamped again, during which, the movement path of the clamping pin 131 in the guide groove of the reversing guide groove portion 12 is as shown in FIG. 3: F→G and due to the shape limitation of the guide groove at the point the reversing guide groove portion cannot continue to descend, thereby achieving the clamping effect; at this time, the gravity of the counterweight 2 and the reversing guide groove portion 12 can be transferred to the clamping pin 131, and thus, the pulling force on the rope at this time is zero; the pin connection of the counterweight disc 6 and the mechanical arm joint 3 is manually released and the counterweight disc 6 is reversely rotated (rotated in the direction of the initial balance torque) so that the rope 4 is reversely wound on the counterweight disc 6 until the rope 4 is again tensioned (at this time, a balance torque opposite in direction to the initial balance torque can be generated on the counterweight disc 6); the pin connection of the counterweight disc 6 and the mechanical arm joint 3 is restored and the counterweight disc 6 is driven by the motor of the mechanical arm joint 3 to reversely rotate (rotate in the direction of the initial balance torque) such that the counterweight and the reversing guide groove portion ascend until the reversing guide groove portion 12 is clamped again, during which, the movement path of the clamping pin 131 in the guide groove of the reversing guide groove portion 12 is as shown in FIG. 3: G→H, and due to the shape limitation of the guide groove at the point H, the reversing guide groove portion 12 cannot continue to ascend, thereby achieving the clamping effect; the counterweight disc 6 is driven by the motor of the mechanical arm joint 3 to positively rotate (rotate in the opposite direction of the initial balance torque) such that the reversing guide groove portion 12 descends until the reversing guide groove portion 12 is clamped again, during which, the movement path of the clamping pin 131 in the guide groove of the reversing guide groove portion 12 is as shown in FIG. 3: H→C→B→A and due to the shape limitation of the guide groove at the point A, the reversing guide groove portion 12 cannot continue to descend, thereby achieving the clamping effect; and at this time, the counterweight 2 and the reversing guide groove portion 12 return to the initial position, and the direction of the balance torque is opposite to the initial direction, that is, the reversing of the balance torque is completed.

While particular embodiments of the present invention have been shown and described, it will be obvious to those skilled in the art that changes and modifications may be made without departing from the spirit and scope of the present invention.

The present invention claimed is:

1. A reversible mechanical arm gravitational torque balancing device, comprising a counterweight guide groove module, a counterweight, a mechanical arm joint, a rope, a guide pulley block, a counterweight disc, a mechanical arm joint link and a rack, wherein the counterweight guide groove module is mounted on the rack to limit the movement of the counterweight, thereby achieving the clamping function; the counterweight has a lower end mounted on the counterweight guide groove module and an upper end connected to the rope, and the rope is wound on the counterweight disc after passing through the guide pulley block mounted on the rack; the mechanical arm joint is mounted on the rack and internally provided with a motor; the counterweight disc is mounted on an output shaft of the motor of the mechanical arm joint and the mechanical arm joint limits the rotational degree of freedom of the counterweight disc around the output shaft of the motor; and the mechanical arm joint link is also mounted on the output shaft of the motor of the mechanical arm joint and the gravity of the mechanical arm joint link produces a gravitational torque on the mechanical arm joint.

2. The reversible mechanical arm gravitational torque balancing device of claim 1, wherein the counterweight guide groove module includes a counterweight mounting block, a reversing guide groove portion, a clamping device, a guide shaft and a module base plate, in which the counterweight is mounted on an upper end of the counterweight mounting block; an upper end of the reversing guide groove portion is mounted on the lower end of the counterweight mounting block, a guide hole matched with the guide shaft is formed in the middle part of the reversing guide groove portion, and a guide groove having a preset shape is formed on the side of the reversing guide groove portion; the clamping device is mounted on the module base plate; a lower end of the guide shaft is mounted on the module base plate; and the reversing guide groove portion is movable up and down along the guide shaft and during the up-and-down movement of the reversing guide groove portion, the guide groove having a preset shape on the side of the reversing guide groove portion cooperates with the clamping device to limit the movement of the reversing guide groove portion in a predetermined position, thereby achieving the clamping function.

3. The reversible mechanical arm gravitational torque balancing device of claim 1, wherein the clamping device includes a clamping pin, a clamping pin mounting bracket, a linear guide, a spring and a spring mounting bracket, in which the clamping pin is mounted on an upper end of the clamping pin mounting bracket; a lower end of the clamping pin mounting bracket is mounted on the upper end of the linear guide; the lower end of the linear guide is mounted on the module base plate; the spring has one end connected to the clamping pin mounting bracket and the other end connected to the spring mounting bracket; and the spring mounting bracket is mounted on the module base plate.

4. The reversible mechanical arm gravitational torque balancing device of claim 3, wherein the clamping pin and the clamping pin mounting bracket as a whole are mounted on the linear guide and movable along the linear guide; and the spring exerts a pulling force on the clamping pin mounting bracket so that the clamping pin and the clamping pin mounting bracket as a whole have a tendency to move toward the spring.

5. The reversible mechanical arm gravitational torque balancing device of claim 1, wherein the gravity of the counterweight and the counterweight mounting block and the reversing guide groove portion of the counterweight guide groove module is converted into a pulling force on the rope, and the pulling force is converted into, on the counterweight disc, a balance torque which is opposite in direction to the gravitational torque and plays a role in balancing the gravitational torque.

6. The reversible mechanical arm gravitational torque balancing device of claim 1, wherein when the direction of the balance torque needs to be changed, the counterweight disk is driven by the motor of the mechanical arm joint to rotate in the opposite direction of the initial balance torque, so that the counterweight ascends and then stops ascending under the limitation of the guide groove having a preset shape on the side of the reversing guide groove portion; the motor of the mechanical arm joint is stopped, so that the counterweight descends under the action of gravity and then stops descending under the limitation of the guide groove during the descending process; the limitation of the counterweight disc by the mechanical arm joint is released; the counterweight disc is rotated in the direction of the initial balance torque to allow the rope to be reversely wound on the counterweight disc, and then the limitation of the counterweight disc by the mechanical arm joint is restored; the counterweight disk is driven by the motor of the mechanical arm joint to rotate in the direction of the initial balance torque, so that the counterweight ascends and then stops ascending under the limitation of the guide groove; and the motor of the mechanical arm joint is stopped, so that at this time, a balance torque, which is converted from the pulling force on the rope, on the counterweight disk is opposite in direction and equal in size to the initial balance torque, thereby achieve the reversing of the balance torque.

\* \* \* \* \*